United States Patent
Langhammer (10) Patent No.: US 9,207,909 B1
(45) Date of Patent: Dec. 8, 2015

(54) POLYNOMIAL CALCULATIONS OPTIMIZED FOR PROGRAMMABLE INTEGRATED CIRCUIT DEVICE STRUCTURES

(71) Applicant: Altera Corporation, San Jose, CA (US)

(72) Inventor: Martin Langhammer, Salisbury (GB)

(73) Assignee: Altera Corporation, San Jose, CA (US)

( * ) Notice: Subject to any disclaimer, the term of this patent is extended or adjusted under 35 U.S.C. 154(b) by 267 days.

(21) Appl. No.: 13/790,106

(22) Filed: Mar. 8, 2013

Related U.S. Application Data (60) Provisional application No. 61/729,797, filed on Nov. 26, 2012.

(51) Int. Cl.
*G06F 7/544* (2006.01)

(52) U.S. Cl.
CPC .................................. *G06F 7/5443* (2013.01)

(58) Field of Classification Search
CPC combination set(s) only.
See application file for complete search history.

(56) References Cited

U.S. PATENT DOCUMENTS

| | | |
|---|---|---|
| 3,473,160 A | 10/1969 | Wahlstrom |
| 3,800,130 A | 3/1974 | Martinson et al. |
| 3,814,924 A | 6/1974 | Tate |
| 3,896,299 A | 7/1975 | Rhodes |
| 4,156,927 A | 5/1979 | McElroy et al. |
| 4,179,746 A | 12/1979 | Tubbs |
| 4,212,076 A | 7/1980 | Conners |
| 4,215,406 A | 7/1980 | Gomola et al. |
| 4,215,407 A | 7/1980 | Gomola et al. |
| 4,422,155 A | 12/1983 | Amir et al. |
| 4,484,259 A | 11/1984 | Palmer et al. |
| 4,490,805 A * | 12/1984 | Tamura .......................... 708/603 |
| 4,521,907 A | 6/1985 | Amir et al. |
| 4,575,812 A | 3/1986 | Kloker et al. |
| 4,597,053 A | 6/1986 | Chamberlin |
| 4,616,330 A | 10/1986 | Betz |
| 4,623,961 A | 11/1986 | Mackiewicz |
| 4,682,302 A | 7/1987 | Williams |
| 4,718,057 A | 1/1988 | Venkitakrishnan et al. |
| 4,727,508 A | 2/1988 | Williams |
| 4,736,335 A | 4/1988 | Barkan |

(Continued)

FOREIGN PATENT DOCUMENTS

| | | |
|---|---|---|
| EP | 0 158 430 | 10/1985 |
| EP | 0 326 415 | 8/1989 |

(Continued)

OTHER PUBLICATIONS

Altera, "DSP Blocks in Stratix III Devices", Chapter 5, pp. 1-42, Mar. 2010.

(Continued)

*Primary Examiner* — Chuong D Ngo
*Assistant Examiner* — Calvin M Brien
(74) *Attorney, Agent, or Firm* — Ropes & Gray LLP; Jeffrey H. Ingerman (57) ABSTRACT

Polynomial circuitry includes a respective partial product generator for each bit position of each term of a plurality of terms of a polynomial to be evaluated. A respective plurality of adders for each bit position adds partial products of a respective bit position across all of the plurality of terms to provide a respective bit-slice sum. Resulting bit-slice sums are offset from one another according to their respective bit positions. A final adder adds together the respective offset bit-slice sums to provide a result.

18 Claims, 8 Drawing Sheets

(56) References Cited

U.S. PATENT DOCUMENTS

| | | | |
|---|---|---|---|
| 4,754,421 | A | 6/1988 | Bosshart |
| 4,777,614 | A | 10/1988 | Ward |
| 4,791,590 | A | 12/1988 | Ku et al. |
| 4,799,004 | A | 1/1989 | Mori |
| 4,811,263 | A | 3/1989 | Hedley et al. |
| 4,823,295 | A | 4/1989 | Mader |
| 4,839,847 | A | 6/1989 | Laprade |
| 4,871,930 | A | 10/1989 | Wong et al. |
| 4,908,788 | A | 3/1990 | Fujiyama |
| 4,912,345 | A | 3/1990 | Steele et al. |
| 4,918,637 | A | 4/1990 | Morton |
| 4,918,638 | A * | 4/1990 | Matsumoto et al. ......... 708/492 |
| 4,967,160 | A | 10/1990 | Quievy et al. |
| 4,974,186 | A * | 11/1990 | Duhamel et al. ............. 708/603 |
| 4,982,354 | A | 1/1991 | Takeuchi et al. |
| 4,991,010 | A | 2/1991 | Hailey et al. |
| 4,994,997 | A | 2/1991 | Martin et al. |
| 4,999,803 | A | 3/1991 | Turrini et al. |
| 5,068,813 | A | 11/1991 | Thoen |
| 5,073,863 | A | 12/1991 | Zhang |
| 5,081,604 | A | 1/1992 | Tanaka |
| 5,122,685 | A | 6/1992 | Chan et al. |
| 5,126,964 | A * | 6/1992 | Zurawski ...................... 708/625 |
| 5,128,559 | A | 7/1992 | Steele |
| 5,175,702 | A | 12/1992 | Beraud et al. |
| 5,208,491 | A | 5/1993 | Ebeling et al. |
| RE34,363 | E | 8/1993 | Freeman |
| 5,267,187 | A | 11/1993 | Hsieh et al. |
| 5,296,759 | A | 3/1994 | Sutherland et al. |
| 5,338,983 | A | 8/1994 | Agarwala |
| 5,339,263 | A | 8/1994 | White |
| 5,349,250 | A | 9/1994 | New |
| 5,357,152 | A | 10/1994 | Jennings, III et al. |
| 5,371,422 | A | 12/1994 | Patel et al. |
| 5,373,461 | A | 12/1994 | Bearden et al. |
| 5,375,079 | A | 12/1994 | Uramoto et al. |
| 5,381,357 | A | 1/1995 | Wedgwood et al. |
| 5,404,324 | A | 4/1995 | Colon-Bonet |
| 5,424,589 | A | 6/1995 | Dobbelaere et al. |
| 5,446,651 | A | 8/1995 | Moyse et al. |
| 5,451,948 | A | 9/1995 | Jekel |
| 5,452,231 | A | 9/1995 | Butts et al. |
| 5,452,375 | A | 9/1995 | Rousseau et al. |
| 5,457,644 | A | 10/1995 | McCollum |
| 5,465,226 | A | 11/1995 | Goto |
| 5,465,375 | A | 11/1995 | Thepaut et al. |
| 5,483,178 | A | 1/1996 | Costello et al. |
| 5,497,498 | A | 3/1996 | Taylor |
| 5,500,812 | A | 3/1996 | Saishi et al. |
| 5,500,828 | A | 3/1996 | Doddington et al. |
| 5,523,963 | A | 6/1996 | Hsieh et al. |
| 5,528,550 | A | 6/1996 | Pawate et al. |
| 5,537,601 | A | 7/1996 | Kimura et al. |
| 5,541,864 | A | 7/1996 | Van Bavel et al. |
| 5,546,018 | A | 8/1996 | New et al. |
| 5,550,993 | A | 8/1996 | Ehlig et al. |
| 5,559,450 | A | 9/1996 | Ngai et al. |
| 5,563,526 | A | 10/1996 | Hastings et al. |
| 5,563,819 | A | 10/1996 | Nelson |
| 5,570,039 | A | 10/1996 | Oswald et al. |
| 5,570,040 | A | 10/1996 | Lytle et al. |
| 5,572,148 | A | 11/1996 | Lytle et al. |
| 5,581,501 | A | 12/1996 | Sansbury et al. |
| 5,590,350 | A | 12/1996 | Guttag et al. |
| 5,594,366 | A | 1/1997 | Khong et al. |
| 5,594,912 | A | 1/1997 | Brueckmann et al. |
| 5,596,763 | A | 1/1997 | Guttag et al. |
| 5,606,266 | A | 2/1997 | Pedersen |
| 5,617,058 | A | 4/1997 | Adrian et al. |
| 5,623,377 | A | 4/1997 | Behrens et al. |
| 5,631,848 | A | 5/1997 | Laczko et al. |
| 5,633,601 | A | 5/1997 | Nagaraj |
| 5,636,150 | A | 6/1997 | Okamoto |
| 5,636,368 | A | 6/1997 | Harrison et al. |
| 5,640,578 | A | 6/1997 | Balmer et al. |
| 5,644,519 | A | 7/1997 | Yatim et al. |
| 5,644,522 | A | 7/1997 | Moyse et al. |
| 5,646,545 | A | 7/1997 | Trimberger et al. |
| 5,646,875 | A | 7/1997 | Taborn et al. |
| 5,648,732 | A | 7/1997 | Duncan |
| 5,652,903 | A | 7/1997 | Weng et al. |
| 5,655,069 | A | 8/1997 | Ogawara et al. |
| 5,664,192 | A | 9/1997 | Lloyd et al. |
| 5,689,195 | A | 11/1997 | Cliff et al. |
| 5,696,708 | A | 12/1997 | Leung |
| 5,729,495 | A | 3/1998 | Madurawe |
| 5,740,404 | A | 4/1998 | Baji |
| 5,744,980 | A | 4/1998 | McGowan et al. |
| 5,744,991 | A | 4/1998 | Jefferson et al. |
| 5,754,459 | A | 5/1998 | Telikepalli |
| 5,761,483 | A | 6/1998 | Trimberger |
| 5,764,555 | A | 6/1998 | McPherson et al. |
| 5,768,613 | A | 6/1998 | Asghar |
| 5,771,186 | A | 6/1998 | Kodali et al. |
| 5,777,912 | A | 7/1998 | Leung et al. |
| 5,784,636 | A | 7/1998 | Rupp |
| 5,790,446 | A | 8/1998 | Yu et al. |
| 5,794,067 | A | 8/1998 | Kadowaki |
| 5,801,546 | A | 9/1998 | Pierce et al. |
| 5,805,477 | A | 9/1998 | Perner |
| 5,805,913 | A | 9/1998 | Guttag et al. |
| 5,808,926 | A | 9/1998 | Gorshtein et al. |
| 5,812,479 | A | 9/1998 | Cliff et al. |
| 5,812,562 | A | 9/1998 | Baeg |
| 5,815,422 | A | 9/1998 | Dockser |
| 5,821,776 | A | 10/1998 | McGowan |
| 5,825,202 | A | 10/1998 | Tavana et al. |
| 5,838,165 | A | 11/1998 | Chatter |
| 5,841,684 | A | 11/1998 | Dockser |
| 5,847,579 | A | 12/1998 | Trimberger |
| 5,847,978 | A | 12/1998 | Ogura et al. |
| 5,847,981 | A | 12/1998 | Kelley et al. |
| 5,859,878 | A | 1/1999 | Phillips et al. |
| 5,869,979 | A | 2/1999 | Bocchino |
| 5,872,380 | A | 2/1999 | Rostoker et al. |
| 5,874,834 | A | 2/1999 | New |
| 5,878,250 | A | 3/1999 | LeBlanc |
| 5,880,981 | A | 3/1999 | Kojima et al. |
| 5,892,962 | A | 4/1999 | Cloutier |
| 5,894,228 | A | 4/1999 | Reddy et al. |
| 5,898,602 | A | 4/1999 | Rothman et al. |
| 5,931,898 | A | 8/1999 | Khoury |
| 5,942,914 | A | 8/1999 | Reddy et al. |
| 5,944,774 | A | 8/1999 | Dent |
| 5,949,710 | A | 9/1999 | Pass et al. |
| 5,951,673 | A | 9/1999 | Miyata |
| 5,956,265 | A | 9/1999 | Lewis |
| 5,959,871 | A | 9/1999 | Pierzchala et al. |
| 5,960,193 | A | 9/1999 | Guttag et al. |
| 5,961,635 | A | 10/1999 | Guttag et al. |
| 5,963,048 | A | 10/1999 | Harrison et al. |
| 5,963,050 | A | 10/1999 | Young et al. |
| 5,968,196 | A | 10/1999 | Ramamurthy et al. |
| 5,970,254 | A | 10/1999 | Cooke et al. |
| 5,978,260 | A | 11/1999 | Trimberger et al. |
| 5,982,195 | A | 11/1999 | Cliff et al. |
| 5,986,465 | A | 11/1999 | Mendel |
| 5,991,788 | A | 11/1999 | Mintzer |
| 5,991,898 | A | 11/1999 | Rajski et al. |
| 5,995,748 | A | 11/1999 | Guttag et al. |
| 5,999,015 | A | 12/1999 | Cliff et al. |
| 5,999,990 | A | 12/1999 | Sharrit et al. |
| 6,005,806 | A | 12/1999 | Madurawe et al. |
| 6,006,321 | A | 12/1999 | Abbott |
| 6,009,451 | A | 12/1999 | Burns |
| 6,018,755 | A | 1/2000 | Gonikberg et al. |
| 6,020,759 | A | 2/2000 | Heile |
| 6,021,423 | A | 2/2000 | Nag et al. |
| 6,026,420 | A | 2/2000 | DesJardins et al. |
| 6,029,187 | A | 2/2000 | Verbauwhede |
| 6,031,763 | A | 2/2000 | Sansbury |
| 6,041,339 | A | 3/2000 | Yu et al. |
| 6,041,340 | A | 3/2000 | Mintzer |
| 6,052,327 | A | 4/2000 | Reddy et al. |

(56) References Cited

U.S. PATENT DOCUMENTS

| | | | |
|---|---|---|---|
| 6,052,755 A | 4/2000 | Terrill et al. | |
| 6,052,773 A | 4/2000 | DeHon et al. | |
| 6,055,555 A | 4/2000 | Boswell et al. | |
| 6,064,614 A | 5/2000 | Khoury | |
| 6,065,131 A | 5/2000 | Andrews et al. | |
| 6,066,960 A | 5/2000 | Pedersen | |
| 6,069,487 A | 5/2000 | Lane et al. | |
| 6,072,994 A | 6/2000 | Phillips et al. | |
| 6,073,154 A | 6/2000 | Dick | |
| 6,075,381 A | 6/2000 | LaBerge | |
| 6,084,429 A | 7/2000 | Trimberger | |
| 6,085,317 A | 7/2000 | Smith | |
| 6,091,261 A | 7/2000 | De Lange | |
| 6,091,765 A | 7/2000 | Pietzold, III et al. | |
| 6,094,726 A | 7/2000 | Gonion et al. | |
| 6,097,988 A | 8/2000 | Tobias | |
| 6,098,163 A | 8/2000 | Guttag et al. | |
| 6,107,820 A | 8/2000 | Jefferson et al. | |
| 6,107,821 A | 8/2000 | Kelem et al. | |
| 6,107,824 A | 8/2000 | Reddy et al. | |
| 6,130,554 A | 10/2000 | Kolze et al. | |
| 6,140,839 A | 10/2000 | Kaviani et al. | |
| 6,144,980 A | 11/2000 | Oberman | |
| 6,154,049 A | 11/2000 | New | |
| 6,157,210 A | 12/2000 | Zaveri et al. | |
| 6,163,788 A | 12/2000 | Chen et al. | |
| 6,167,415 A | 12/2000 | Fischer et al. | |
| 6,175,849 B1 | 1/2001 | Smith | |
| 6,215,326 B1 | 4/2001 | Jefferson et al. | |
| 6,226,735 B1 | 5/2001 | Mirsky | |
| 6,242,947 B1 | 6/2001 | Trimberger | |
| 6,243,729 B1 | 6/2001 | Staszewski | |
| 6,246,258 B1 | 6/2001 | Lesea | |
| 6,260,053 B1 | 7/2001 | Maulik et al. | |
| 6,279,021 B1 | 8/2001 | Takano et al. | |
| 6,286,024 B1 | 9/2001 | Yano et al. | |
| 6,314,442 B1 | 11/2001 | Suzuki | |
| 6,314,551 B1 | 11/2001 | Borland | |
| 6,321,246 B1 | 11/2001 | Page et al. | |
| 6,323,680 B1 | 11/2001 | Pedersen et al. | |
| 6,327,605 B2 | 12/2001 | Arakawa et al. | |
| 6,346,824 B1 | 2/2002 | New | |
| 6,351,142 B1 | 2/2002 | Abbott | |
| 6,353,843 B1 | 3/2002 | Chehrazi et al. | |
| 6,359,468 B1 | 3/2002 | Park et al. | |
| 6,360,240 B1 | 3/2002 | Takano et al. | |
| 6,362,650 B1 | 3/2002 | New et al. | |
| 6,366,944 B1 | 4/2002 | Hossain et al. | |
| 6,367,003 B1 | 4/2002 | Davis | |
| 6,369,610 B1 | 4/2002 | Cheung et al. | |
| 6,377,970 B1 | 4/2002 | Abdallah et al. | |
| 6,385,632 B1 | 5/2002 | Choe et al. | |
| 6,407,576 B1 | 6/2002 | Ngai et al. | |
| 6,407,694 B1 | 6/2002 | Cox et al. | |
| 6,427,157 B1 | 7/2002 | Webb | |
| 6,434,587 B1 | 8/2002 | Liao et al. | |
| 6,438,569 B1 | 8/2002 | Abbott | |
| 6,438,570 B1 | 8/2002 | Miller | |
| 6,446,107 B1 | 9/2002 | Knowles | |
| 6,453,382 B1 | 9/2002 | Heile | |
| 6,467,017 B1 | 10/2002 | Ngai et al. | |
| 6,480,980 B2 | 11/2002 | Koe | |
| 6,483,343 B1 | 11/2002 | Faith et al. | |
| 6,487,575 B1 | 11/2002 | Oberman | |
| 6,523,055 B1 | 2/2003 | Yu et al. | |
| 6,523,057 B1 | 2/2003 | Savo et al. | |
| 6,531,888 B2 | 3/2003 | Abbott | |
| 6,538,470 B1 | 3/2003 | Langhammer et al. | |
| 6,542,000 B1 | 4/2003 | Black et al. | |
| 6,556,044 B2 | 4/2003 | Langhammer et al. | |
| 6,557,092 B1 | 4/2003 | Callen | |
| 6,571,268 B1 | 5/2003 | Giacalone et al. | |
| 6,573,749 B2 | 6/2003 | New et al. | |
| 6,574,762 B1 | 6/2003 | Karimi et al. | |
| 6,578,060 B2 | 6/2003 | Chen et al. | |
| 6,591,283 B1 | 7/2003 | Conway et al. | |
| 6,591,357 B2 | 7/2003 | Mirsky | |
| 6,600,495 B1 | 7/2003 | Boland et al. | |
| 6,600,788 B1 | 7/2003 | Dick et al. | |
| 6,628,140 B2 | 9/2003 | Langhammer et al. | |
| 6,687,722 B1 | 2/2004 | Larsson et al. | |
| 6,692,534 B1 | 2/2004 | Wang et al. | |
| 6,700,581 B2 | 3/2004 | Baldwin et al. | |
| 6,725,441 B1 | 4/2004 | Keller et al. | |
| 6,728,901 B1 | 4/2004 | Rajski et al. | |
| 6,731,133 B1 | 5/2004 | Feng et al. | |
| 6,732,134 B1 | 5/2004 | Rosenberg | |
| 6,744,278 B1 | 6/2004 | Liu et al. | |
| 6,745,254 B2 | 6/2004 | Boggs et al. | |
| 6,763,367 B2 | 7/2004 | Kwon et al. | |
| 6,771,094 B1 | 8/2004 | Langhammer et al. | |
| 6,774,669 B1 | 8/2004 | Liu et al. | |
| 6,781,408 B1 | 8/2004 | Langhammer | |
| 6,781,410 B2 | 8/2004 | Pani et al. | |
| 6,788,104 B2 | 9/2004 | Singh et al. | |
| 6,801,924 B1 | 10/2004 | Green et al. | |
| 6,806,733 B1 | 10/2004 | Pan et al. | |
| 6,836,839 B2 | 12/2004 | Master et al. | |
| 6,874,079 B2 | 3/2005 | Hogenauer | |
| 6,889,238 B2 | 5/2005 | Johnson | |
| 6,904,471 B2 | 6/2005 | Boggs et al. | |
| 6,917,955 B1 | 7/2005 | Botchev | |
| 6,924,663 B2 | 8/2005 | Masui et al. | |
| 6,963,890 B2 | 11/2005 | Dutta et al. | |
| 6,971,083 B1 | 11/2005 | Farrugia et al. | |
| 6,978,287 B1 | 12/2005 | Langhammer | |
| 6,983,300 B2 | 1/2006 | Ferroussat | |
| 7,020,673 B2 | 3/2006 | Ozawa | |
| 7,024,446 B2 | 4/2006 | Langhammer et al. | |
| 7,047,272 B2 | 5/2006 | Giacalone et al. | |
| 7,061,268 B1 * | 6/2006 | Lee et al. | 326/39 |
| 7,062,526 B1 | 6/2006 | Hoyle | |
| 7,093,204 B2 | 8/2006 | Oktem et al. | |
| 7,107,305 B2 | 9/2006 | Deng et al. | |
| 7,113,969 B1 | 9/2006 | Green et al. | |
| 7,181,484 B2 | 2/2007 | Stribaek et al. | |
| 7,200,631 B2 | 4/2007 | Mailaender et al. | |
| 7,230,451 B1 | 6/2007 | Langhammer | |
| 7,313,585 B2 | 12/2007 | Winterrowd | |
| 7,343,388 B1 | 3/2008 | Burney et al. | |
| 7,395,298 B2 | 7/2008 | Debes et al. | |
| 7,401,109 B2 | 7/2008 | Koc et al. | |
| 7,409,417 B2 | 8/2008 | Lou | |
| 7,415,542 B2 | 8/2008 | Hennedy et al. | |
| 7,421,465 B1 | 9/2008 | Rarick et al. | |
| 7,428,565 B2 | 9/2008 | Fujimori | |
| 7,428,566 B2 | 9/2008 | Siu et al. | |
| 7,430,578 B2 | 9/2008 | Debes et al. | |
| 7,430,656 B2 | 9/2008 | Sperber et al. | |
| 7,447,310 B2 | 11/2008 | Koc et al. | |
| 7,472,155 B2 | 12/2008 | Simkins et al. | |
| 7,508,936 B2 | 3/2009 | Eberle et al. | |
| 7,536,430 B2 | 5/2009 | Guevokian et al. | |
| 7,567,997 B2 | 7/2009 | Simkins et al. | |
| 7,590,676 B1 | 9/2009 | Langhammer | |
| 7,646,430 B2 | 1/2010 | Brown Elliott et al. | |
| 7,668,896 B2 | 2/2010 | Lutz et al. | |
| 7,719,446 B2 | 5/2010 | Rosenthal et al. | |
| 7,720,898 B2 | 5/2010 | Driker et al. | |
| 7,769,797 B2 | 8/2010 | Cho et al. | |
| 7,814,136 B1 | 10/2010 | Verma et al. | |
| 7,814,137 B1 | 10/2010 | Mauer | |
| 7,822,799 B1 | 10/2010 | Langhammer et al. | |
| 7,836,117 B1 | 11/2010 | Langhammer et al. | |
| 7,865,541 B1 | 1/2011 | Langhammer | |
| 7,917,567 B1 | 3/2011 | Mason et al. | |
| 7,930,335 B2 | 4/2011 | Gura | |
| 7,930,336 B2 | 4/2011 | Langhammer | |
| 7,949,699 B1 | 5/2011 | Neoh et al. | |
| 7,974,997 B2 | 7/2011 | Arviv et al. | |
| 8,041,759 B1 | 10/2011 | Langhammer et al. | |
| 8,090,758 B1 | 1/2012 | Shimanek et al. | |
| 8,112,466 B2 | 2/2012 | Minz et al. | |
| 8,301,681 B1 | 10/2012 | Lee et al. | |

(56) References Cited

U.S. PATENT DOCUMENTS

| | | | |
|---|---|---|---|
| 8,307,023 | B1 | 11/2012 | Leung et al. |
| 8,386,550 | B1 | 2/2013 | Mauer et al. |
| 8,386,553 | B1 | 2/2013 | Langhammer et al. |
| 8,396,914 | B1 | 3/2013 | Langhammer |
| 2001/0023425 | A1 | 9/2001 | Oberman et al. |
| 2001/0029515 | A1 | 10/2001 | Mirsky |
| 2001/0037351 | A1 | 11/2001 | Hellberg |
| 2001/0037352 | A1 | 11/2001 | Hong |
| 2002/0002573 | A1 | 1/2002 | Landers et al. |
| 2002/0032713 | A1 | 3/2002 | Jou et al. |
| 2002/0038324 | A1 | 3/2002 | Page et al. |
| 2002/0049798 | A1 | 4/2002 | Wang et al. |
| 2002/0078114 | A1 | 6/2002 | Wang et al. |
| 2002/0089348 | A1 | 7/2002 | Langhammer |
| 2002/0116434 | A1 | 8/2002 | Nancekievill |
| 2002/0129073 | A1 | 9/2002 | Page et al. |
| 2003/0088757 | A1 | 5/2003 | Lindner et al. |
| 2004/0064770 | A1 | 4/2004 | Xin |
| 2004/0083412 | A1 | 4/2004 | Corbin et al. |
| 2004/0103133 | A1 | 5/2004 | Gurney |
| 2004/0122882 | A1 | 6/2004 | Zakharov et al. |
| 2004/0148321 | A1 | 7/2004 | Guevorkian et al. |
| 2004/0172439 | A1 | 9/2004 | Lin |
| 2004/0178818 | A1 | 9/2004 | Crotty et al. |
| 2004/0193981 | A1 | 9/2004 | Clark et al. |
| 2004/0267857 | A1 | 12/2004 | Abel et al. |
| 2004/0267863 | A1 | 12/2004 | Bhushan et al. |
| 2005/0038842 | A1 | 2/2005 | Stoye |
| 2005/0120122 | A1 | 6/2005 | Farnham |
| 2005/0144212 | A1 | 6/2005 | Simkins et al. |
| 2005/0144215 | A1 | 6/2005 | Simkins et al. |
| 2005/0144216 | A1 | 6/2005 | Simkins et al. |
| 2005/0166038 | A1 | 7/2005 | Wang et al. |
| 2005/0187997 | A1 | 8/2005 | Zheng et al. |
| 2005/0187999 | A1 | 8/2005 | Zheng et al. |
| 2005/0262175 | A1 | 11/2005 | Iino et al. |
| 2006/0020655 | A1 | 1/2006 | Lin |
| 2006/0059215 | A1 | 3/2006 | Maharatna et al. |
| 2006/0112160 | A1 | 5/2006 | Ishii et al. |
| 2006/0200732 | A1 | 9/2006 | Dobbek et al. |
| 2007/0083585 | A1 | 4/2007 | St. Denis et al. |
| 2007/0124352 | A1 | 5/2007 | Wittig |
| 2007/0185951 | A1 | 8/2007 | Lee et al. |
| 2007/0185952 | A1 | 8/2007 | Langhammer et al. |
| 2007/0226287 | A1 | 9/2007 | Lin et al. |
| 2007/0241773 | A1 | 10/2007 | Hutchings et al. |
| 2008/0133627 | A1 | 6/2008 | Langhammer et al. |
| 2008/0159441 | A1 | 7/2008 | Liao et al. |
| 2008/0183783 | A1 | 7/2008 | Tubbs |
| 2009/0028455 | A1 | 1/2009 | Nakamura et al. |
| 2009/0083358 | A1 | 3/2009 | Allen |
| 2009/0113186 | A1 | 4/2009 | Kato et al. |
| 2009/0172052 | A1 | 7/2009 | DeLaquil et al. |
| 2009/0187615 | A1 | 7/2009 | Abe et al. |
| 2009/0228689 | A1 | 9/2009 | Muff et al. |
| 2009/0300088 | A1 | 12/2009 | Michaels et al. |
| 2010/0098189 | A1 | 4/2010 | Oketani |
| 2010/0131577 | A1 | 5/2010 | Gangalakurti et al. |
| 2010/0146022 | A1 | 6/2010 | Swartzlander et al. |
| 2010/0191939 | A1 | 7/2010 | Muff et al. |
| 2011/0161389 | A1 | 6/2011 | Langhammer et al. |
| 2011/0219052 | A1 | 9/2011 | Langhammer |
| 2011/0238720 | A1 | 9/2011 | Langhammer et al. |
| 2011/0320513 | A1 | 12/2011 | Langhammer |
| 2012/0054254 | A1 | 3/2012 | Langhammer |
| 2012/0054256 | A1 | 3/2012 | Langhammer |
| 2012/0113133 | A1 | 5/2012 | Shpigelblat |
| 2012/0166512 | A1 | 6/2012 | Wong et al. |
| 2012/0191967 | A1 | 7/2012 | Lin et al. |
| 2012/0290819 | A1 | 11/2012 | Langhammer |

FOREIGN PATENT DOCUMENTS

| | | |
|---|---|---|
| EP | 0 380 456 | 8/1990 |
| EP | 0 411 491 | 2/1991 |
| EP | 0 419 105 | 3/1991 |
| EP | 0 461 798 | 12/1991 |
| EP | 0 498 066 | 8/1992 |
| EP | 0 555 092 | 8/1993 |
| EP | 0 606 653 | 7/1994 |
| EP | 0 657 803 | 6/1995 |
| EP | 0 660 227 | 6/1995 |
| EP | 0 668 659 | 8/1995 |
| EP | 0 721 159 | 7/1996 |
| EP | 0 905 906 | 3/1999 |
| EP | 0 909 028 | 4/1999 |
| EP | 0 927 393 | 7/1999 |
| EP | 0 992 885 | 4/2000 |
| EP | 1 031 934 | 8/2000 |
| EP | 1 049 025 | 11/2000 |
| EP | 1 058 185 | 12/2000 |
| EP | 1 220 108 | 7/2002 |
| GB | 2 283 602 | 5/1995 |
| GB | 2 286 737 | 8/1995 |
| GB | 2 318 198 | 4/1998 |
| JP | 61-237133 | 10/1986 |
| JP | 63-216131 | 8/1988 |
| JP | 4-332036 | 11/1992 |
| JP | 5-134851 | 6/1993 |
| JP | 06-187129 | 7/1994 |
| JP | 7-135447 | 5/1995 |
| JP | 11-296345 | 10/1999 |
| JP | 2000-259394 | 9/2000 |
| JP | 2002-108606 | 4/2002 |
| JP | 2002-251281 | 9/2002 |
| WO | WO95/27243 | 10/1995 |
| WO | WO96/28774 | 9/1996 |
| WO | WO97/08606 | 3/1997 |
| WO | WO98/12629 | 3/1998 |
| WO | WO98/32071 | 7/1998 |
| WO | WO98/38741 | 9/1998 |
| WO | WO99/22292 | 5/1999 |
| WO | WO99/31574 | 6/1999 |
| WO | WO99/56394 | 11/1999 |
| WO | WO00/51239 | 8/2000 |
| WO | WO00/52824 | 9/2000 |
| WO | WO01/13562 | 2/2001 |
| WO | WO 2005/066832 | 7/2005 |
| WO | WO 2005/101190 | 10/2005 |
| WO | WO 2010/102007 | 9/2010 |

OTHER PUBLICATIONS

Altera Corporation, "Stratix II Device Handbook, Chapter 6—DSP Blocks in Stratix II Devices," v1.1, Jul. 2004.

Altera Corporation, "Digital Signal Processing (DSP)," *Stratix Device Handbook*, vol. 2, Chapter 6 and Chapter 7, v1.1 (Sep. 2004).

Altera Corporation, "DSP Blocks in Stratix II and Stratix II GX Devices," *Stratix II Device Handbook*, vol. 2, Chapter 6, v4.0 (Oct. 2005).

Altera Corporation, "FIR Compiler: MegaCore® Function User Guide," version 3.3.0, rev. 1, pp. 3 11 through 3 15 (Oct. 2005).

Altera Corporation, "Advanced Synthesis Cookbook: A Design Guide for Stratix II, Stratix III and Stratix IV Devices," Document Version 3.0, 112 pgs., May 2008.

Amos, D., "PLD architectures match DSP algorithms," *Electronic Product Design*, vol. 17, No. 7, Jul. 1996, pp. 30, 32.

Analog Devices, Inc., The Applications Engineering Staff of Analog Devices, DSP Division, *Digital Signal Processing Applications Using the ADSP-2100 Family* (edited by Amy Mar), 1990, pp. 141-192).

Andrejas, J., et al., "Reusable DSP functions in FPGAs," *Field-Programmable Logic and Applications. Roadmap to Reconfigurable Computing. 10th International Conference, FPL 2000. Proceedings (Lecture Notes in Computer Science vol. 1896)* Aug. 27-30, 2000, pp. 456-461.

Aoki, T., "Signed-weight arithmetic and its application to a field-programmable digital filter architecture," *IEICE Transactions on Electronics*, 1999, vol. E82C, No. 9, Sep. 1999, pp. 1687-1698.

(56) References Cited

OTHER PUBLICATIONS

Ashour, M.A., et al., "An FPGA implementation guide for some different types of serial-parallel multiplier-structures," *Microelectronics Journal*, vol. 31, No. 3, 2000, pp. 161-168.
Berg, B.L., et al."Designing Power and Area Efficient Multistage FIR Decimators with Economical Low Order Filters," *ChipCenter Technical Note*, Dec. 2001.
Bursky, D., "Programmable Logic Challenges Traditional ASIC SoC Designs", *Electronic Design*, Apr. 15, 2002.
Chhabra, A. et al., Texas Instruments Inc., "A Block Floating Point Implementation on the TMS320C54x DSP", Application Report SPRA610, Dec. 1999, pp. 1-10.
Colet, P., "When DSPs and FPGAs meet: Optimizing image processing architectures," *Advanced Imaging*, vol. 12, No. 9, Sep. 1997, pp. 14, 16, 18.
Crookes, D., et al., "Design and implementation of a high level programming environment for FPGA-based image processing," *IEE Proceedings-Vision, Image and Signal Processing*, vol. 147, No. 4, Aug. 2000, pp. 377-384.
Debowski, L., et al., "A new flexible architecture of digital control systems based on DSP and complex CPLD technology for power conversion applications," *PCIM 2000: Europe Official Proceedings of the Thirty-Seventh International Intelligent Motion Conference*, Jun. 6-8, 2000, pp. 281-286.
de Dinechin, F. et al., "Large multipliers with less DSP blocks," retrieved from http://hal-ens-lyon.archives-ouvertes.fr/ensl-00356421/en/, 9 pgs., available online Jan. 2009.
de Dinechin F.,et al., "FPGA-Specific Custom Arithmetic Datapath Design: LIP Research Report RR2010-34," Dec. 2010, 8 pages.
Dick, C., et al., "Configurable logic for digital communications: some signal processing perspectives," *IEEE Communications Magazine*, vol. 37, No. 8, Aug. 1999, pp. 107-111.
Do, T.-T., et al., "A flexible implementation of high-performance FIR filters on Xilinx FPGAs," *Field-Programmable Logic and Applications: From FPGAs to Computing Paradigm. 8th International Workshop, FPL '98. Proceedings*, Hartenstein, R.W., et al., Aug.-Sep. 3, 1998, pp. 441-445.
Farooqui, A., et al., "General Data-Path Organization of a MAC unit for VLSI Implementation of DSP Processors," ISCAS '98, Part 2, May 31, 1998-Jun. 3, 1998, pp. 260-263.
Fujioka, Y., et al., "240 MOPS Reconfigurable Parallel VLSI Processor for Robot Control", Proceedings of the 1992 International Conference on Industrial Electronics, Control, Instrumentation, and Automation, vol. 3, pp. 1385-1390, Nov. 9-13, 1992.
Gaffer, A.A., et al., "Floating-Point Bitwidth Analysis via Automatic Differentiation," *IEEE Conference on Field Programmable Technology*, Hong Kong, Dec. 2002.
Govindu, G. et al., "A Library of Parameterizable Floating-Point Cores for FPGAs and Their Application to Scientific Computing," *Proc Int'l Conf. Eng. Reconfigurable Systems and Algorithms* (ERSA'05), Jun. 2005.
Govindu, G. et al., "Analysis of High-performance Floating-point Arithmetic on FPGAs," *Proceedings of the 18th International Parallel and Distributed Processing Symposium* (PDPS'04) pp. 149-156, Apr. 2004.
Guccione, S.A.,"Run-time Reconfiguration at Xilinx," *Parallel and distributed processing: 15 IPDPS 2000 workshops*, Rolim, J., ed., May 1-5, 2000, p. 873.
Hauck, S., "The Future of Reconfigurable Systems," *Keynote Address, 5th Canadian Conference on Field Programmable Devices*, Jun. 1998, http:--.www.ee.washington.edu-people-faculty-hauck-publications-ReconfigFuture.PDF.
Haynes, S.D., et al., "Configurable multiplier blocks for embedding in FPGAs," *Electronicas Letters*, vol. 34, No. 7, pp. 638-639 (Apr. 2, 1998).
Heysters, P.M., et al., "Mapping of DSP algorithms on field programmable function arrays," *Field-Programmable Logic and Applications. Roadmap to Reconfigurable Computing. 10th International Conference, FPL 2000, Proceedings* (Lecture Notes in Computer Science vol. 1896) Aug. 27-30, 2000, pp. 400-411.
Huang, J., et al., "Simulated Performance of 1000BASE-T Receiver with Different Analog Front End Designs," *Proceedings of the 35th Asilomar Conference on Signals, Systems, and Computers*, Nov. 4-7, 2001.
IEEE Standard for Binary Floating-Point Arithmetic, *ANSI/IEEE Standard, Std 754*, 1985, pp. 1-14.
IEEE Standard for Floating-Point Arithmetic, *IEEE Std 754*, 2008, pp. 1-58.
"Implementing Multipliers in FLEX 10K EABs", *Altera*, Mar. 1996.
"Implementing Logic with the Embedded Array in Flex 10K Devices", *Altera*, May 2001, ver. 2.1.
Jinghua Li, "Design a pocket multi-bit multiplier in FPGA," *1996 2nd International Conference on ASIC Proceedings* (IEEE Cat. No. 96TH8140) Oct. 21-24, 1996, pp. 275-279.
Jones, G., "Field-programmable digital signal conditioning," *Electronic Product Design*, vol. 21, No. 6, Jun. 2000, pp. C36-C38.
Karlstrom, K., et al., "High Performance, Low Latency FPGA based Floating Point Adder and Multiplier Units in a Virtex 4," Norchip Conf., pp. 31-34, 2006.
Kiefer, R., et al., "Performance comparison of software-FPGA hardware partitions for a DSP application" *14th Australian Microelectronics Conference, Microelectronics: Technology Today for the Future, MICRO '97 Proceedings*, Sep. 28-Oct. 1, 1997, pp. 88-93.
Kim, Y., et al., "Fast GPU Implementation for the Solution of Tridiagonal Matrix Systems," *Journal of Korean Institute of Information Scientists and Engineers*, vol. 32, No. 12, pp. 692-704, Dec. 2005.
Kramberger, I., "DSP acceleration using a reconfigurable FPGA," *ISIE '99.Proceedings of the IEEE International Symposium on Industrial Electronics* (Cat.No. 99TH8465), vol. 3, Jul. 12-16, 1999, pp. 1522-1525.
Langhammer, M., "How to implement DSP in programmable logic," *Elettronica Oggi*, No. 266, Dec. 1998, pp. 113-115.
Langhammer, "Floating Point Datapath Synthesis for FPGAs," *IEEE International Conference on Field Programmable Logic and Applications, 2008* (FPL 2008), pp. 355-360 (Sep. 8-10, 2008).
Langhammer, M., "Implementing a DSP in Programmable Logic," *Online EE Times*, May 1998, http:--www.eetimes.com-editorial-1998-coverstory9805.html.
Lazaravich, B.V., "Function block oriented field programmable logic arrays," *Motorola, Inc. Technical Developments*, vol. 18, Mar. 1993, pp. 10-11.
Lattice Semiconductor Corp, *ORCA® FPGA Express™ Interface Manual: ispLEVER® Version 3.0*, 2002.
Lucent Technologies, Microelectronics Group,"Implementing and Optimizing Multipliers in ORCA™ FPGAs,", Application Note. AP97-008FGPA, Feb. 1997.
Lund, D., et al., "A new development system for reconfigurable digital signal processing," First International Conference on 3G Mobile Communication Technologies (Conf. Publ. No. 471), Mar. 27-29, 2000, pp. 306-310.
Martinson, L. et al., "Digital matched Filtering with Pipelined Floating Point Fast Fourier Transforms (FFT's)," *IEEE Transactions on Acoustics, Speech, and Signal Processing*, vol. ASSP-23, No. 2, pp. 222-234, Apr. 1975.
Miller, N.L., et al., "Reconfigurable integrated circuit for high performance computer arithmetic," *Proceedings of the 1998 IEE Colloquium on Evolvable Hardware Systems* (Digest), No. 233, 1998, pp. 2-1-2-4.
Mintzer, L., "Xilinx FPGA as an FFT processor," *Electronic Engineering*, vol. 69, No. 845, May 1997, pp. 81, 82, 84.
Faura et al., "A Novel Mixed Signal Programmable Device With On-Chip Microprocessor," Custom Integrated Circuits Conference, 1997. Proceedings of the IEEE 1997 Santa Clara, CA, USA, May 5, 1997, pp. 103-106.
Nakasato, N., et al., "Acceleration of Hydrosynamical Simulations using a FPGA board", *The Institute of Electronics Information and Communication Technical Report CPSY2005-47*, vol. 105, No. 515, Jan. 17, 2006.
Nedjah, N., et al., "Fast Less Recursive Hardware for Large Number Multiplication Using Karatsuba-Ofman's Algorithm," *Computer and Information Sciences—ISCIS*, pp. 43-50, 2003.

(56) References Cited

OTHER PUBLICATIONS

Nozal, L., et al., "A new vision system: programmable logic devices and digital signal processor architecture (PLD+FDSP)," *Proceedings IECON '91. 1991 International Conference on Industrial Electronics, Control and Instrumentation* (Cat. No. 91CH2976-9) vol. 3, Oct. 28-Nov. 1, 1991, pp. 2014-2018.

Osana, Y., et al., "Hardware-resource Utilization Analysis on an FPGA-Based Biochemical Simulator ReCSiP", *The Institute of Electronics Information and Communication Technical Report CPSY2005-63*, vol. 105, No. 516, Jan. 18, 2006.

Papenfuss, J.R, et al., "Implementation of a real-time, frequency selective, RF channel simulator using a hybrid DSP-FPGA architecture," *RAWCON 2000: 2000 IEEE Radio and Wireless Conference* (Cat. No. 00EX404), Sep. 10-13, 2000, pp. 135-138.

Parhami, B., "Configurable arithmetic arrays with data-driven control," *34th Asilomar Conference on Signals, Systems and Computers*, vol. 1, 2000, pp. 89-93.

"The QuickDSP Design Guide", Quicklogic, Aug. 2001, revision B.

"QuickDSP™ Family Data Sheer", *Quicklogic*, Aug. 7, 2001, revision B.

Rangasayee, K., "Complex PLDs let you produce efficient arithmetic designs," *EDN (European Edition)* vol. 41, No. 13, Jun. 20, 1996, pp. 109, 110, 112, 114, 116.

Rosado, A., et al., "A high-speed multiplier coprocessor unit based on FPGA," *Journal of Electrical Engineering*, vol. 48, No. 11-12, 1997, pp. 298-302.

Santillan-Q., G.F., et al., "Real-time integer convolution implemented using systolic arrays and a digit-serial architecture in complex programmable logic devices," *Proceedings of the Third International Workshop on Design of Mixed-Mode Integrated Circuits and Applications* (Cat. No.99EX303) Jul. 26-28, 1999, pp. 147-150.

Texas Instruments Inc., "TMS320C54x DSP Reference Set, vol. 1: CPU and Peripherals", Literature No. SPRU131F, Apr. 1999, pp. 2-1 through 2-16 and 4-1 through 4-29.

Thapliyal, H., et al., "Combined Integer and Floating Point Multiplication Architecture (CIFM) for FPGSs and Its Reversible Logic Implementation", *Proceedings MWSCAS 2006*, Puerto Rico, 5 pages, Aug. 2006.

Thapliyal, H., et al., "Combined Integer and Variable Precision (CIVP) Floating Point Multiplication Architecture for FPGAs", *Proceedings of the 2007 International Conference on Parallel and Distributed Processing Techniques and Applications (PDPTA'07)*, Las Vegas, US, vol. 1, pp. 449-450, Jun. 2007.

Tisserand, A., et al., "An on-line arithmetic based FPGA for low power custom computing," *Field Programmable Logic and Applications, 9th International Workshop, FPL'99, Proceedings (Lecture Notes in Computer Science vol. 1673)*,Lysaght, P., et al., eds., Aug. 30-Sep. 1, 1999, pp. 264-273.

Tralka, C., "Symbiosis of DSP and PLD," *Elektronik*, vol. 49, No. 14, Jul. 11, 2000, pp. 84-96.

Underwood, K. "FPGAs vs. CPUs: Trends in Peak Floating-Point Performance," *Proceedings of the 2004 ACM-SIGDA 12th International Symposium on Field Programmable Gate Arrays*, pp. 171-180, Feb. 22-24, 2004.

Valls, J., et al., "A Study About FPGA-Based Digital Filters," *Signal Processing Systems, 1998*, SIPS 98, 1998 IEEE Workshop, Oct. 10, 1998, pp. 192-201.

"Virtex-II 1.5V Field-Programmable Gate Arrays", *Xilinx*, Jan. 25, 2001, module 2 of 4.

"Virtex-II 1.5V Field-Programmable Gate Arrays", *Xilinx*, Apr. 2, 2001, module 1 of 4.

"Virtex-II 1.5V Field-Programmable Gate Arrays", *Xilinx*, Apr. 2, 2001, module 2 of 4.

Vladimirova, T. et al., "Floating-Point Mathematical Co-Processor for a Single-Chip On-Board Computer," *MAPLD'03 Conference, D5*, Sep. 2003.

Wajih, E.-H.Y. et al., "Efficient Hardware Architecture of Recursive Karatsuba-Ofman Multiplier," $3^{rd}$ *International Conference on Design and Technology of Integrated Systems in Nanoscale Era*, 6 pgs, Mar. 2008.

Walters, A.L., "A Scaleable Fir Filter Implementation Using 32-bit Floating-Point Complex Arithmetic on ,a FPGA Based Custom Computing Platform," Allison L. Walters, Thesis Submitted to the Faculty of Virginia Polytechnic Institute and State University, Jan. 30, 1998.

Weisstein, E.W., "Karatsuba Multiplication," *MathWorld—A Wolfram Web Resource* (Dec. 9, 2007), accessed Dec. 11, 2007 at http:--.mathworld.wolfram.com-KaratsubaMultiplication.html.

Wenzel, L., "Field programmable gate arrays (FPGAs) to replace digital signal processor integrated circuits," *Elektronik*, vol. 49, No. 5, Mar. 7, 2000, pp. 78-86.

"Xilinx Unveils New FPGA Architecture to Enable High-Performance, 10 Million System Gate Designs", *Xilinx*, Jun. 22, 2000.

"Xilinx Announces DSP Algorithms, Tools and Features for Virtex-II Architecture", *Xilinx*, Nov. 21, 2000.

Xilinx Inc., "Virtex-II 1.5V Field-Programmable Gate Arrays", Advance Product Specification, DS031-2 (v1.9), Nov. 29, 2001, Module 2 of 4, pp. 1-39.

Xilinx Inc., "Using Embedded Multipliers", Virtex-II Platform FPGA Handbook, UG002 (v1.3), Dec. 3, 2001, pp. 251-257.

Xilinx, Inc., "A 1D Systolic FIR," copyright 1994-2002, downloaded from http:--www.iro.umontreal.ca-~aboulham-F6221-Xilinx%20A%201D%20systolic%20FIR.htm.

Xilinx, Inc., "The Future of FPGA's,"White Paper, available Nov. 14, 2005 for download from http:--www.xilinx.com-prs_rls,5yrwhite.htm.

Xilinx Inc., "XtremeDSP Design Considerations User Guide," v 1.2, Feb. 4, 2005.

Xilinx Inc., "Complex Multiplier v2.0", DS291 Product Specification/Datasheet, Nov. 2004.

Xilinx, Inc., "Virtex-5 ExtremeDSP Design Considerations," *User Guide UG193*,v2.6, 114 pages, Oct. 2007.

Xilinx, Inc., "Implementing Barrel Shifters Using Multipliers", p. 1-4, Aug. 17, 2004.

Zhou, G. et al., "Efficient and High-Throughput Implementations of AES-GCM on FPGAs," *International Conference on Field-Programmable Technology*, 8 pgs., Dec. 2007.

\* cited by examiner

POLYNOMIAL CALCULATIONS OPTIMIZED FOR PROGRAMMABLE INTEGRATED CIRCUIT DEVICE STRUCTURES

CROSS REFERENCE TO RELATED APPLICATION

This claims the benefit of commonly-assigned U.S. Provisional Patent Application No. 61/729,797, filed Nov. 26, 2012, which is hereby incorporated by reference herein in its entirety.

FIELD OF THE INVENTION

This invention relates to computing floating-point polynomials in programmable integrated circuit devices such as programmable logic devices (PLDs).

BACKGROUND OF THE INVENTION

Certain operations, such as certain memory operations, require evaluation of multiple shifted instances of the same polynomials. This is commonly done by adding multiple shifted partial products for each term, and then adding together all of those sums. However, such an operation may be inefficient when implemented in certain types of devices, particularly in programmable devices such as field-programmable gate arrays (FPGAs) that perform logic operations using arrangements of look-up tables (LUTs). In particular, because at or near both the most-significant bit and the least significant bit there are many empty positions, the addition operations do not pack efficiently into the LUTs.

SUMMARY OF THE INVENTION

The present invention relates to method and circuitry for implementing polynomial calculations using logic structures such as those found in programmable devices such as FPGAs. Instead of summing all of the partial products for each respective multiplier, and then adding together those sums, the partial products are summed across all multipliers in a bit-slice-by-bit-slice order. The sums of the bit slices are then in turn shifted by their relative indices and summed, and then reduced as necessary. Because the initial addition is across a bit slice, all bit positions within the sum will have similar hamming count—i.e., will be similarly populated. Therefore, the sums will pack efficiently into LUTs. Moreover, any level of pipelining can be used.

In accordance with embodiments of the invention, there is provided polynomial circuitry including a respective partial product generator for each bit position of each term of a plurality of terms of a polynomial to be evaluated. A respective plurality of adders for each bit position adds partial products of a respective bit position across all of the plurality of terms to provide a respective bit-slice sum. Resulting bit-slice sums are offset from one another according to their respective bit positions. A final adder adds together the respective offset bit-slice sums to provide a result.

A method of configuring a programmable device as such polynomial circuitry is also provided, and a non-transitory machine-readable data storage medium is provided that is encoded with software for performing the method of configuring such circuitry on a programmable device.

BRIEF DESCRIPTION OF THE DRAWINGS

Further features of the invention, its nature and various advantages will be apparent upon consideration of the following detailed description, taken in conjunction with the accompanying drawings, in which like reference characters refer to like parts throughout, and in which.

DETAILED DESCRIPTION OF THE INVENTION

One example of the use of embodiments of the current invention is the evaluation of Galois Field (or finite field) polynomials. When large Galois Field multiplier arrays (such as those used for a Chien search in Flash memory error-correcting codes, including BCH and Reed-Solomon codes) are used, the performance on an FPGA is greatly reduced because of the depth of logic. If the calculation is pipelined, the resource count increases significantly because of inefficiencies of packing the partial product calculations into LUTs effectively.

According to embodiments of the current invention, a Galois Field polynomial may be mapped in a new way onto FPGA logic structures. These embodiments can be used to quickly and efficiently evaluate polynomials for such applications such as the aforementioned Chien search used by BCH and Reed Solomon decoders. System performance requirements may require that these structures operate at speeds over 300 MHz, which may not be possible with previously known polynomial structures for FPGAs, particularly for some BCH applications that use larger field sizes (e.g., 13-15 bits).

A Chien search of polynomials requires one finite field multiplier for each polynomial term. If more than one location is checked at a time, the polynomial can be shifted to check another location by simply shifting each polynomial term. Shifting of the polynomial terms can be accomplished by multiplying each term with the required finite field value in multipliers 101, and summing all of the multiplier outputs together in adder 102, as shown in the arrangement in FIG. 1, in which the an terms are Galois Field elements that represent powers of the roots of the field, and the Xn terms are Galois Field elements that represent terms of the error locator polynomial (i.e., the polynomial being searched).

Figure 2:
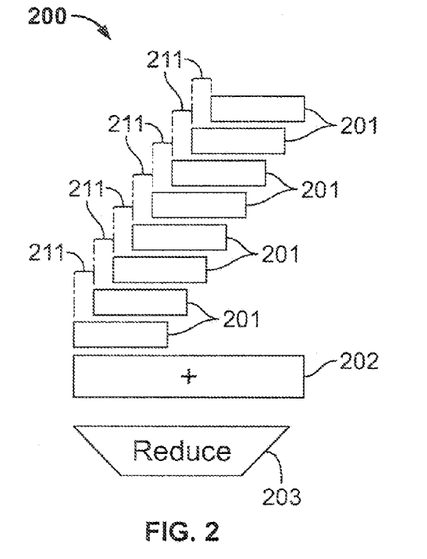
FIG. 2 shows schematically a circuit arrangement that can serve as one of the multipliers in FIG. 1.
Figure 3:
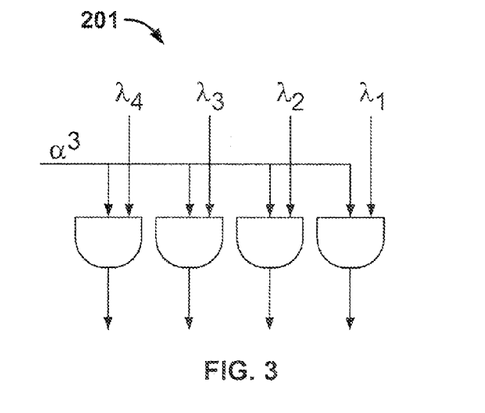
FIG. 3 shows schematically a circuit arrangement that can serve as one of the partial product generators in FIG. 2.

Each finite field multiplier 101 may have the structure 200 shown in FIG. 2, in which there are m partial products 201 having m bits each, where m is the number of bits in the field. Each respective partial product may be generated by ANDing the $\lambda_n$ input with a respective bit of the an input, as shown in the example of FIG. 3, which shows example of a 4-bit polynomial term ($\lambda$) and one bit of a root powers value ($\alpha$) generating one 4-bit partial product (in this case m=4). Each partial product is left shifted (211) by the bit position index of the bit in the second input to which it corresponds. The partial products are all summed in adder 202, creating a value having 2m−1 bits. That number is then reduced back to m-bits at 203 using the irreducible polynomial for the field, according to any of various known reduction techniques.

Figure 1:
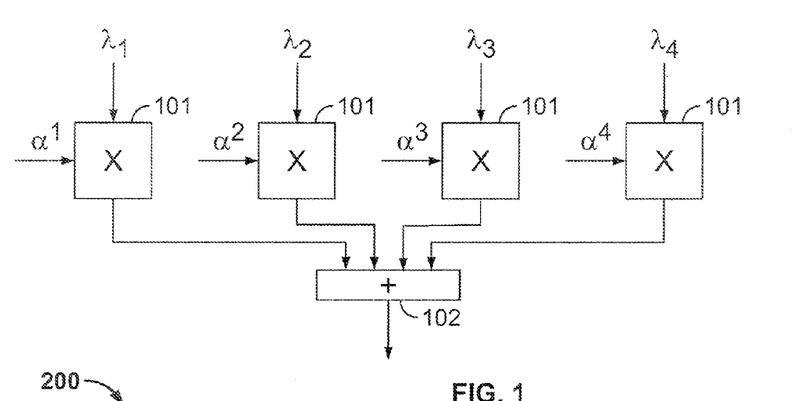
FIG. 1 shows a conceptual arrangement for evaluating shifted polynomials.
Figure 4:
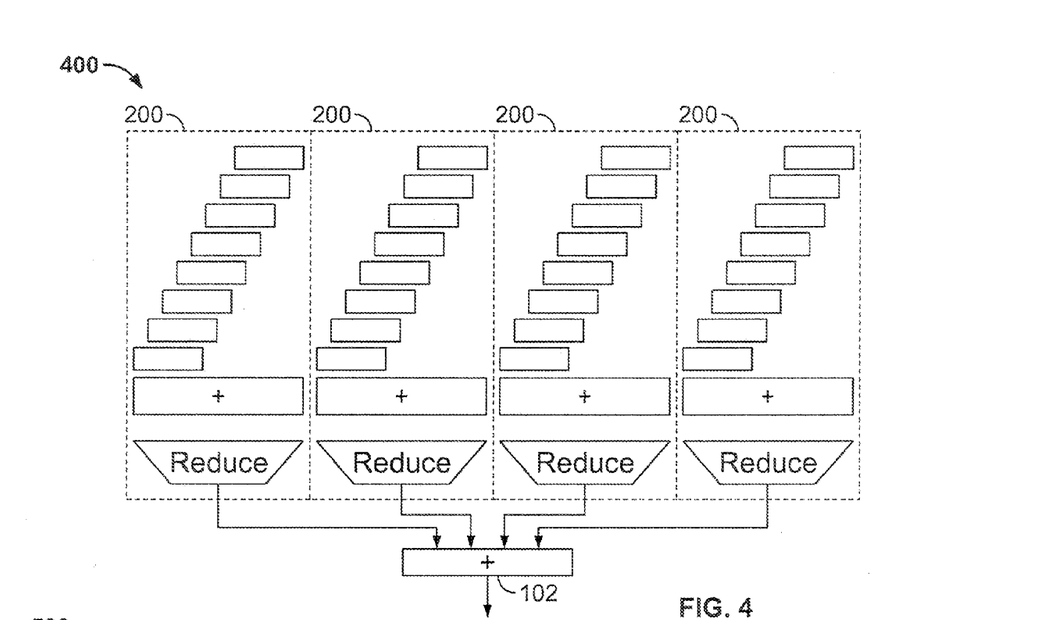
FIG. 4 shows a circuit arrangement in which the arrangement of FIG. 2 is provided in place of each of the multipliers in FIG. 1.
Figure 5:
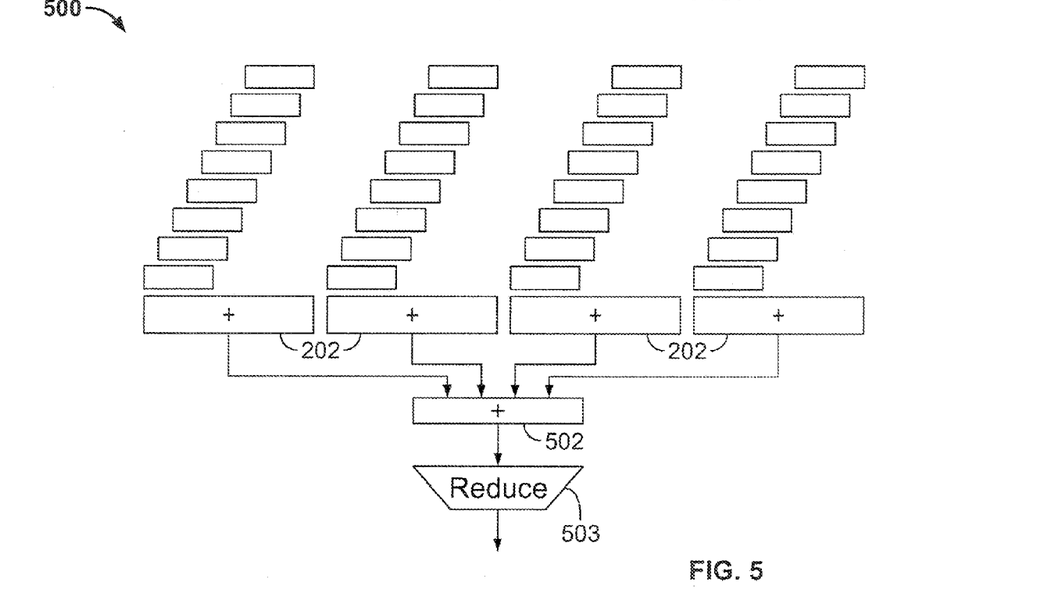
FIG. 5 shows an optimization of the arrangement of FIG. 3.

Thus, the arrangement of FIG. 1 may have the structure 400 shown in FIG. 4, with each multiplier 101 replaced with a copy of structure 200. One way to improve the efficiency of structure 400 is to eliminate the individual reducers 203, add the outputs of the various adders 202 in a further adder 502, and then apply a single reduction 503, as shown in FIG. 5, and as described in copending, commonly-assigned U.S. patent application Ser. No. 12/719,770, which is hereby incorporated by reference herein in its entirety.

However, even with the structure of FIG. 5, adding together all of the partial products still creates a potentially large number of values each having 2m−1 bits. This may create a very long logic path from the input finite field numbers $\alpha, \lambda$ to the output of the result. And if pipelining is used (by cutting the paths at any point, whether within or between the individual multipliers), the logic size may increase significantly, because of the uneven packing of the relatively shifted partial product bits into the LUTs, which increases as pipelining depth increases.

Figure 6:
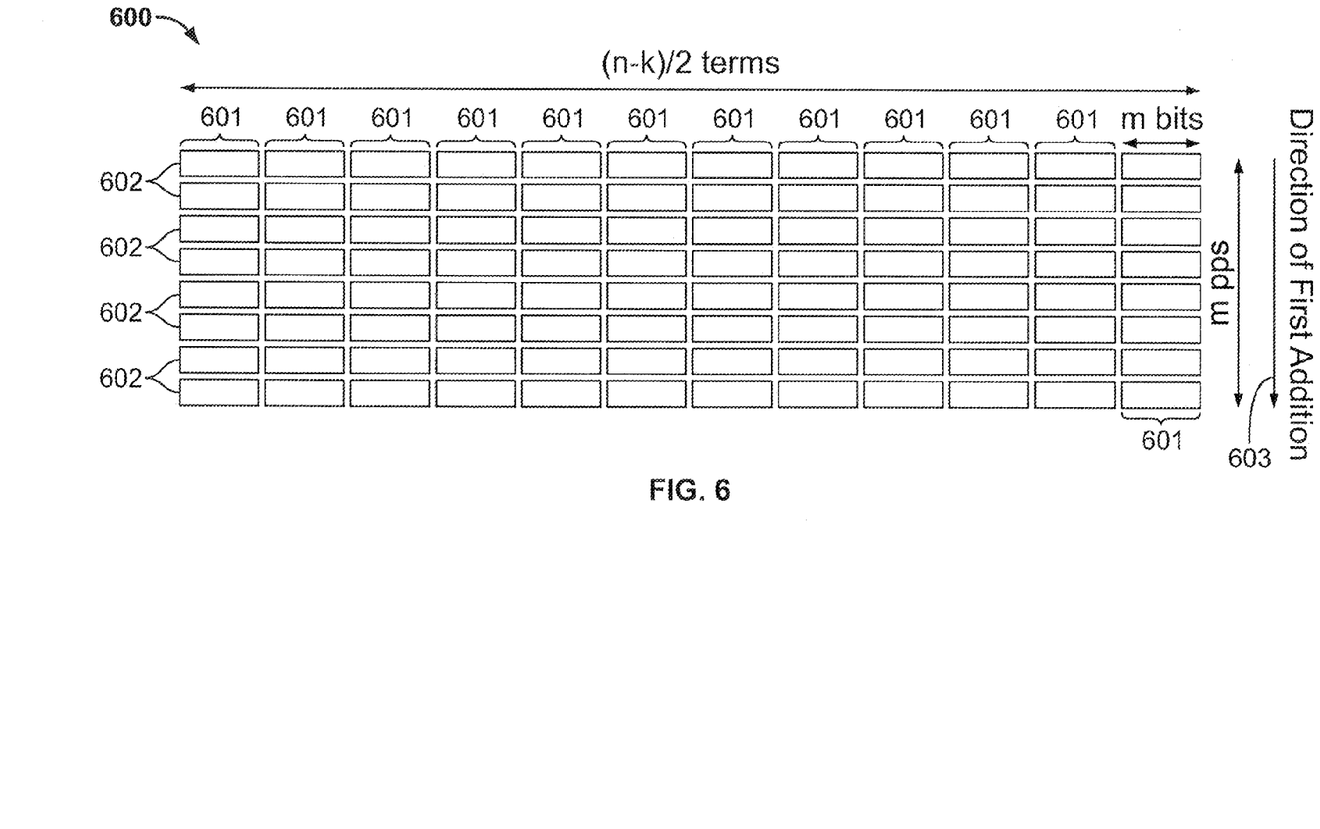
FIG. 6 shows the order of operations in the arrangements of FIGS. 2-5.
Figure 7:
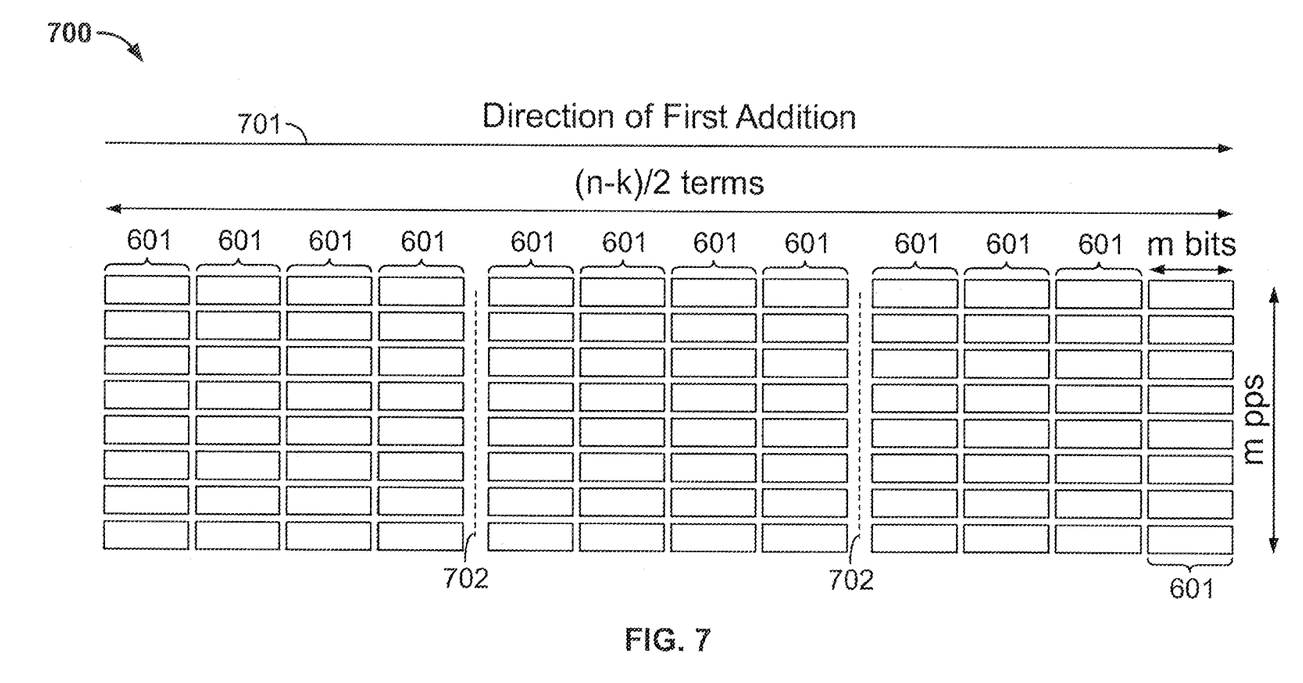
FIG. 7 shows the order of operations in accordance with embodiments of the present invention.

A solution in accordance with embodiments of the invention may be appreciated after considering FIGS. 6 and 7.

FIG. 6 is a diagrammatic representation of the matrix 600 of operations performed by arrangements such as that of the circuit arrangement of FIG. 5. Each multiplier is represented by a column 601. There are (n−k)/2 multipliers, corresponding to the number of columns, where n is the number of bits (for BCH coding) or symbols (for Reed-Solomon coding) in the codeword, and k is the number of data bits or symbols in the codeword—i.e., (n−k) is the number of parity bits or symbols in the codeword. There are m partial product generators 602 per multiplier, each m bits wide. Relative shifts are not shown. As indicated by arrow 603, the direction of first addition, corresponding to adders 202, is downward.

It can be shown mathematically that the identical result would be obtained if, as in matrix 700 of FIG. 7, the direction of first addition were horizontal as indicated by arrow 701. This may be implemented, as one example, by the circuit arrangement 750 of FIG. 8.

Figure 8:
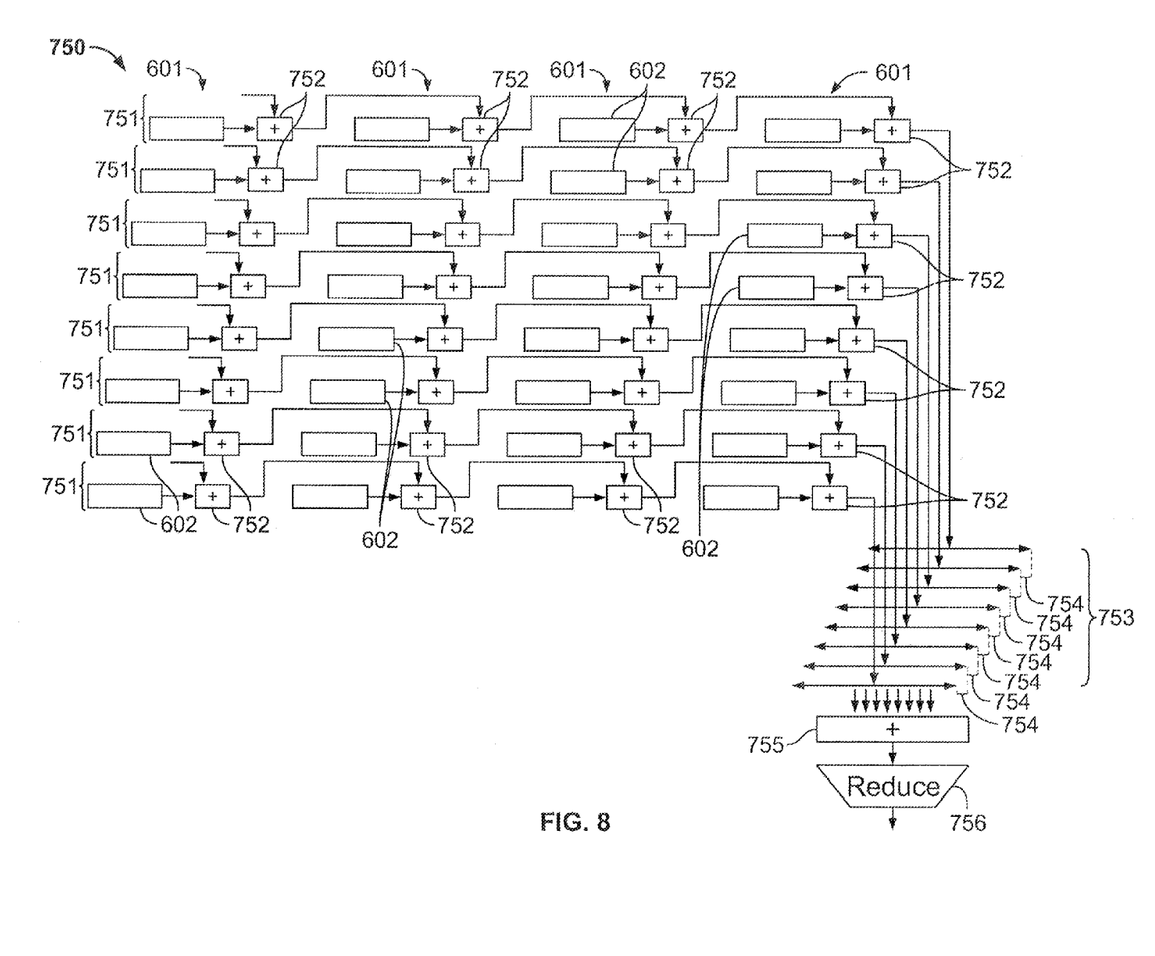
FIG. 8 shows a circuit arrangement in accordance with an embodiment of the present invention.

In arrangement 750, each column 601 of partial products 602 still represents a single term of the polynomial being evaluated (the relative shifts are shown in this drawing). However, unlike in arrangement 500, the partial products 602 in each of columns 601 are not added together in this case. Instead, the partial products 602 in each of rows 751 are added first. As shown here, this may be accomplished with a respective adder 752. It will be appreciated that while the adders 752 are shown as being logically located in each respective row 751 between each respective column 601, they may physically be present in those locations, but they also may be elsewhere on the programmable integrated circuit device and connected by routing resources of the programmable integrated circuit device to the respective partial product generators 602.

After all of the rows 751 have been added, the resulting sums 753, which are aligned with respective 1-bit offsets 754 as shown, are added by adder 755, and then reduced at 756 from 2m−1 bits to m bits. Because the additions of rows 751 occur prior to the offsetting or shifting, they can be efficiently packed into the LUTs of a programmable device. Therefore, even if the addition operations are pipelined (possible cut points where pipelining may occur are shown at dashed lines 702 of FIG. 7), there will be minimal additional programmable logic of the programmable device required to complete the additions. Although the final addition 755 occurs after offsetting or shifting, it is only one operation, so any inefficiency introduced at that point also has minimal effect.

As noted above, when arrangement 750 is constructed in programmable logic, adders 752 may be located elsewhere than between the partial product generators 602. Indeed, both the partial product generators 602 and the adders 752 could be configured by a user completely from programmable logic resources along with programmable interconnect resources. As one alternative, separate dedicated multiplication circuits may be provided in hard-wired form on the programmable device and the user may use the programmable interconnect resources to create addition circuits and connect them to the dedicated multiplication circuits to form arrangement 750.

Figure 12:
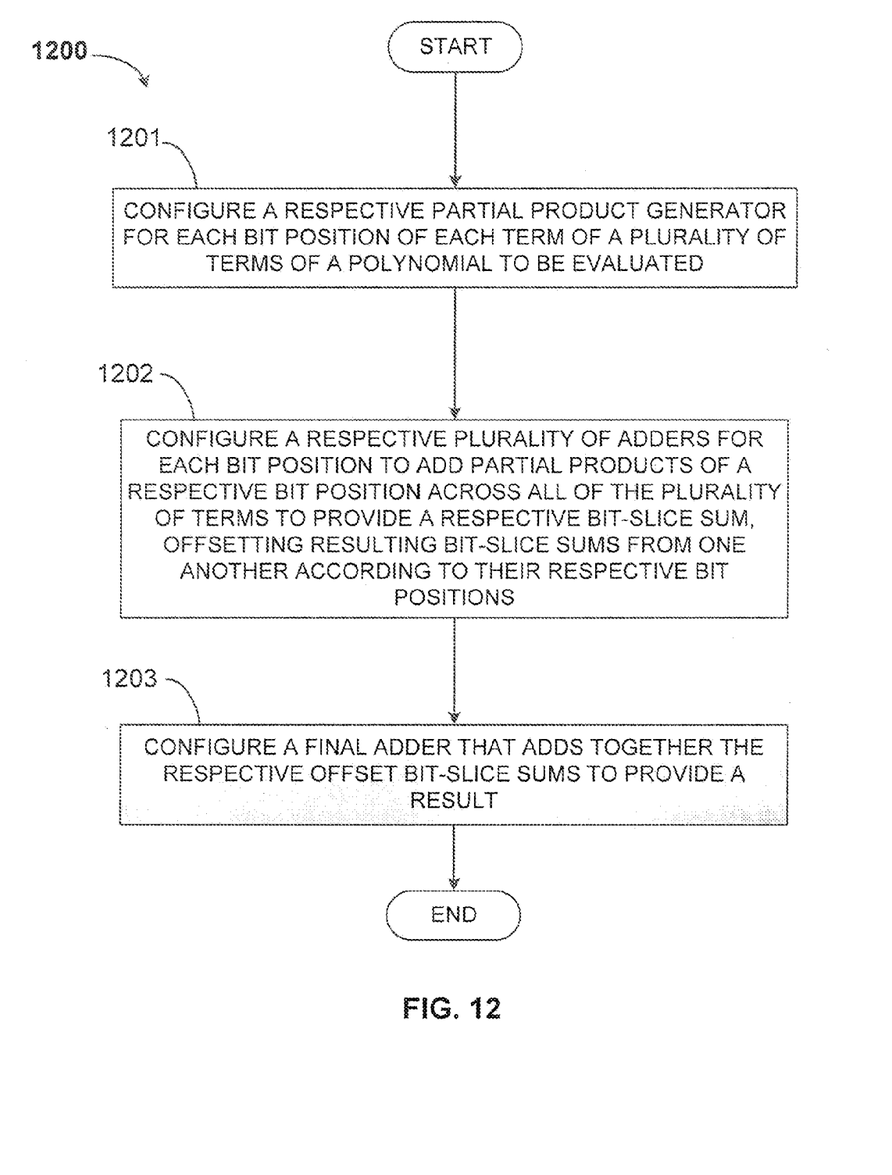
FIG. 12 is a flow diagram of an example of a method according to an embodiment of the present invention.

One example of a method 1200 for configuring a programmable device as circuitry for evaluating a polynomial in accordance with an embodiment of the present invention is diagrammed in FIG. 12. Method 1200 begins at 1201, where, on the programmable device, a respective partial product generator is configured for each bit position of each term of a plurality of terms of a polynomial to be evaluated. Next, at 1202, a respective plurality of adders is configured on the programmable device for each bit position, to add partial products of a respective bit position across all of the plurality of terms to provide a respective bit-slice sum, wherein resulting bit-slice sums are offset from one another according to their respective bit positions. Finally, at 1203, a final adder that adds together said respective offset bit-slice sums to provide a result is configured on the programmable device.

Thus it is seen that circuitry and methods for efficiently performing polynomial calculations have been provided.

Instructions for carrying out a method according to this invention for programming a programmable device to perform polynomial calculations, may be encoded on a machine-readable medium, to be executed by a suitable computer or similar device to implement the method of the invention for programming or configuring PLDs or other programmable devices to perform operations as described above. For example, a personal computer may be equipped with an interface to which a PLD can be connected, and the personal computer can be used by a user to program the PLD using a suitable software tool, such as the QUARTUS® II software available from Altera Corporation, of San Jose, Calif.

Figure 9:
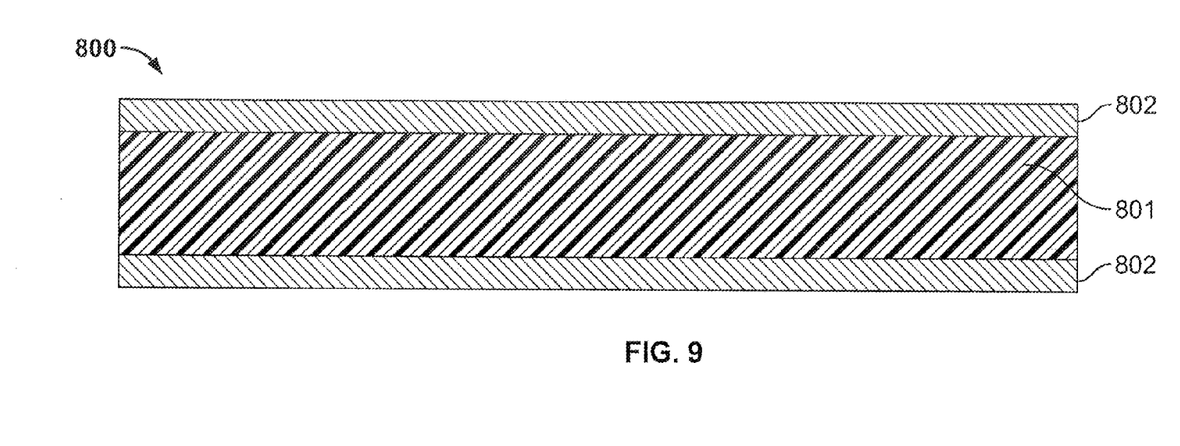
FIG. 9 is a cross-sectional view of a magnetic data storage medium encoded with a set of machine-executable instructions for performing a method according to the present invention.

FIG. 9 presents a cross section of a magnetic data storage medium 800 which can be encoded with a machine executable program that can be carried out by systems such as the aforementioned personal computer, or other computer or similar device. Medium 800 can be a floppy diskette or hard disk, or magnetic tape, having a suitable substrate 801, which may be conventional, and a suitable coating 802, which may be conventional, on one or both sides, containing magnetic domains (not visible) whose polarity or orientation can be altered magnetically. Except in the case where it is magnetic tape, medium 800 may also have an opening (not shown) for receiving the spindle of a disk drive or other data storage device.

The magnetic domains of coating 802 of medium 800 are polarized or oriented so as to encode, in manner which may be conventional, a machine-executable program, for execution by a programming system such as a personal computer or other computer or similar system, having a socket or peripheral attachment into which the PLD to be programmed may be inserted, to configure appropriate portions of the PLD, including its specialized processing blocks, if any, in accordance with the invention.

Figure 10:
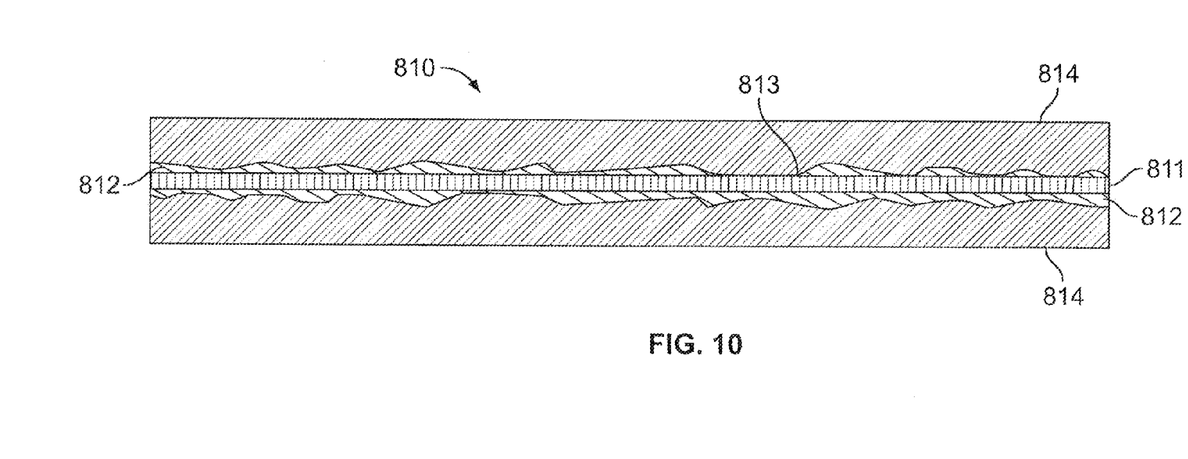
FIG. 10 is a cross-sectional view of an optically readable data storage medium encoded with a set of machine executable instructions for performing a method according to the present invention.

FIG. 10 shows a cross section of an optically-readable data storage medium 810 which also can be encoded with such a machine-executable program, which can be carried out by systems such as the aforementioned personal computer, or other computer or similar device. Medium 810 can be a conventional compact disk read-only memory (CD-ROM) or digital video disk read-only memory (DVD-ROM) or a rewriteable medium such as a CD-R, CD-RW, DVD-R, DVD-RW, DVD+R, DVD+RW, or DVD-RAM or a magneto-optical disk which is optically readable and magneto-optically rewriteable. Medium 810 preferably has a suitable substrate 811, which may be conventional, and a suitable coating 812, which may be conventional, usually on one or both sides of substrate 811.

In the case of a CD-based or DVD-based medium, as is well known, coating 812 is reflective and is impressed with a plurality of pits 813, arranged on one or more layers, to encode the machine-executable program. The arrangement of pits is read by reflecting laser light off the surface of coating 812. A protective coating 814, which preferably is substantially transparent, is provided on top of coating 812.

In the case of magneto-optical disk, as is well known, coating 812 has no pits 813, but has a plurality of magnetic domains whose polarity or orientation can be changed magnetically when heated above a certain temperature, as by a laser (not shown). The orientation of the domains can be read by measuring the polarization of laser light reflected from coating 812. The arrangement of the domains encodes the program as described above.

A PLD 90 programmed according to the present invention may be used in many kinds of electronic devices. One possible use is in a data processing system 900 shown in FIG. 11. Data processing system 900 may include one or more of the following components: a processor 901; memory 902; I/O circuitry 903; and peripheral devices 904. These components are coupled together by a system bus 905 and are populated on a circuit board 906 which is contained in an end-user system 907.

Figure 11:
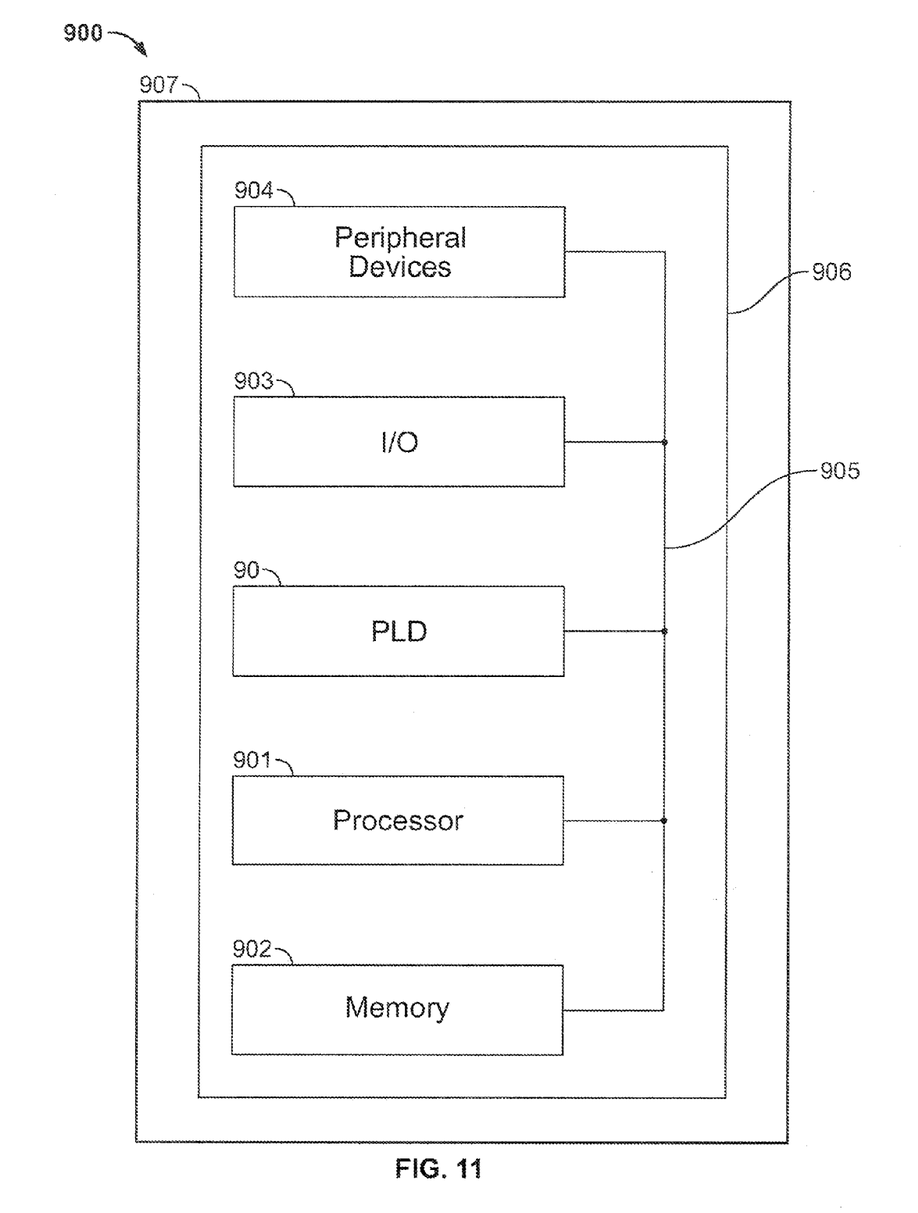
FIG. 11 is a simplified block diagram of an illustrative system employing a programmable logic device incorporating the present invention.

System 900 can be used in a wide variety of applications, such as computer networking, data networking, instrumentation, video processing, digital signal processing, or any other application where the advantage of using programmable or reprogrammable logic is desirable. PLD 90 can be used to perform a variety of different logic functions. For example, PLD 90 can be configured as a processor or controller that works in cooperation with processor 901. PLD 90 may also be used as an arbiter for arbitrating access to a shared resources in system 900. In yet another example, PLD 90 can be configured as an interface between processor 901 and one of the other components in system 900. It should be noted that system 900 is only exemplary, and that the true scope and spirit of the invention should be indicated by the following claims.

Various technologies can be used to implement PLDs 90 as described above and incorporating this invention.

It will be understood that the foregoing is only illustrative of the principles of the invention, and that various modifications can be made by those skilled in the art without departing from the scope and spirit of the invention. For example, the various elements of this invention can be provided on a PLD in any desired number and/or arrangement. One skilled in the art will appreciate that the present invention can be practiced by other than the described embodiments, which are presented for purposes of illustration and not of limitation, and the present invention is limited only by the claims that follow.

What is claimed is:

1. Polynomial circuitry for evaluating a polynomial having a plurality of terms, each term having a number of bit positions, said polynomial circuitry comprising:

a plurality of groups of partial product generators, each of said groups of partial product generators corresponding to a single term in said plurality of terms and, in each one of said groups of partial product generators, each respective partial product generator in said one of said groups of partial product generators providing an output value for a respective single input bit position of said single term to which said one of said groups of partial product generators corresponds;

adder circuitry for providing respective bit-slice sums, said adder circuitry comprising a plurality of respective groups of adders, each respective group of adders in said plurality of respective groups of adders including a number of adders equal in number to said plurality of terms and corresponding to one respective bit position in all of said plurality of terms, and summing output values of multiple ones of said partial product generators for said one respective bit position to provide said respective bit-slice sum having a respective bit-width, wherein resulting bit-slice sums are offset from one another, by less than their respective bit-widths, according to their respective bit positions, said plurality of groups of adders being equal in number to said number of bit positions; and a final adder that adds together said respective offset bit-slice sums to provide a final result.

2. The polynomial circuitry of claim 1 wherein:
said terms have m bit positions; and
each respective partial product generator provides a partial result that is m bits wide.

3. The polynomial circuitry of claim 2 further comprising reduction circuitry that reduces width of said final result to m bits.

4. The polynomial circuitry of claim 1 further comprising reduction circuitry that reduces bit width of said final result.

5. The polynomial circuitry of claim 1 wherein each adder of said plurality of respective groups of adders is configured using at least one look-up table of a programmable integrated circuit device.

6. The polynomial circuitry of claim 5 wherein said programmable integrated circuit device comprises a field-programmable gate array.

7. A method of configuring a programmable device as circuitry for evaluating a polynomial having a plurality of terms, each term having a number of bit positions, said method comprising:

configuring, on said programmable device, a plurality of groups of partial product generators, each of said groups of partial product generators corresponding to a single term in said plurality of terms and, in each one of said groups of partial product generators, each respective partial product generator in said one of said groups of partial product generators providing an output value for a respective single input bit position of said single term to which said one of said groups of partial product generators corresponds;

configuring, on said programmable device, adder circuitry for providing respective bit-slice sums, said adder circuitry comprising a plurality of respective groups of adders, each respective group of adders in said plurality of respective groups of adders including a number of adders equal in number to said plurality of terms and corresponding to one respective bit position in all of said plurality of terms, and summing output values of multiple ones of said partial product generators for said one respective bit position to provide said respective bit-slice sum having a respective bit-width, wherein resulting bit-slice sums are offset from one another, by less than their respective bit-widths, according to their respective bit positions, said plurality of groups of adders being equal in number to said number of bit positions; and configuring, on said programmable device, a final adder that adds together said respective offset bit-slice sums to provide a final result.

8. The method of claim 7 wherein:

said terms have m bit positions; and said configuring a plurality of partial product generators comprises configuring each partial product generator to provide a partial result that is m bits wide.

9. The method of claim 8 further comprising configuring, on said programmable device, reduction circuitry that reduces width of said final result to m bits.

10. The method of claim 7 further comprising configuring, on said programmable device, reduction circuitry that reduces bit width of said final result.

11. The method of claim 7 wherein configuring adder circuitry comprises configuring each adder of said respective groups of adders using at least one look-up table of a programmable integrated circuit device.

12. The method of claim 11 wherein configuring adder circuitry comprises configuring each adder of said respective groups of adders using at least one look-up table of a field-programmable gate array.

13. A non-transitory machine-readable data storage medium encoded with non-transitory machine-executable instructions for configuring a programmable device as circuitry for evaluating a polynomial having a plurality of terms, each term having a number of bit positions, said instructions comprising:

instructions to configure, on said programmable device, a plurality of groups of partial product generators, each of said groups of partial product generators corresponding to a single term in said plurality of terms and, in each one of said groups of partial product generators, each respective partial product generator in said one of said groups of partial product generators providing an output value for a respective single input bit position of said single term to which said one of said groups of partial product generators corresponds;

instructions to configure, on said programmable device, adder circuitry for providing respective bit-slice sums, said adder circuitry comprising a plurality of respective groups of adders, each respective group of adders in said plurality of respective groups of adders including a number of adders equal in number to said plurality of terms and corresponding to one respective bit position in all of said plurality of terms, and summing output values of multiple ones of said partial product generators for said one respective bit position to provide said respective bit-slice sum having a respective bit-width, wherein resulting bit-slice sums are offset from one another, by less than their respective bit-widths, according to their respective bit positions, said plurality of groups of adders being equal in number to said number of bit positions; and instructions to configure, on said programmable device, a final adder that adds together said respective offset bit-slice sums to provide a final result.

14. The non-transitory machine-readable data storage medium of claim 13 wherein:

said terms have m bit positions; and said instructions to configure a plurality of partial product generators comprises configuring each partial product generator to provide a partial result that is m bits wide.

15. The non-transitory machine-readable data storage medium of claim 14 further comprising instructions to configure, on said programmable device, reduction circuitry that reduces width of said final result to m bits.

16. The non-transitory machine-readable data storage medium of claim 13 further comprising instructions to configure, on said programmable device, reduction circuitry that reduces bit width of said final result.

17. The non-transitory machine-readable data storage medium of claim 13 wherein said instructions to configure adder circuitry comprise instructions to configure each adder of said respective groups of adders using at least one look-up table of a programmable integrated circuit device.

18. The non-transitory machine-readable data storage medium of claim 17 wherein said instructions to configure adder circuitry comprise instructions to configure each adder of said respective groups of adders using at least one look-up table of a field-programmable gate array.

* * * * *